United States Patent
Tenmyo et al.

[11] Patent Number: 6,022,117
[45] Date of Patent: Feb. 8, 2000

[54] ILLUMINATING DEVICE FOR PROJECTING LIGHT

[75] Inventors: Yoshiharu Tenmyo; Tokuichi Tsunekawa, both of Yokohama, Japan

[73] Assignee: Canon Kabushiki Kaisha, Tokyo, Japan

[21] Appl. No.: 08/944,473

[22] Filed: Oct. 6, 1997

[30]     Foreign Application Priority Data

| Oct. 9, 1996 | [JP] | Japan | ................................ 8-287691 |
| Oct. 9, 1996 | [JP] | Japan | ................................ 8-287692 |

[51] Int. Cl.$^7$ .............................. G03B 15/02; F21V 8/00
[52] U.S. Cl. .............................. 362/17; 362/16; 362/551; 362/301
[58] Field of Search ............................ 362/551, 16, 17, 362/301, 298, 297, 346

[56]     References Cited

U.S. PATENT DOCUMENTS

| 4,547,044 | 10/1985 | Jain et al. ................................ 350/433 |
| 5,117,312 | 5/1992 | Dolan ................................ 362/298 X |
| 5,459,592 | 10/1995 | Shibatani et al. ................................ 359/40 |
| 5,462,700 | 10/1995 | Beeson et al. ................................ 362/551 X |
| 5,772,306 | 6/1998 | Okuchi ................................ 362/551 X |
| 5,813,743 | 9/1998 | Naka ................................ 362/16 |

FOREIGN PATENT DOCUMENTS

| 57-150826 | 9/1982 | Japan . |
| 59-165037 | 9/1984 | Japan . |
| 4-147118 | 5/1992 | Japan . |
| 8-234277 | 9/1996 | Japan . |
| 8-334811 | 12/1996 | Japan . |
| 9-179171 | 7/1997 | Japan . |

*Primary Examiner*—Laura K. Tso
*Attorney, Agent, or Firm*—Fitzpatrick, Cella, Harper & Scinto

[57]     ABSTRACT

An illumination device includes a light source and an optical member, and is arranged to project a light beam emitted from the light source, via the optical member as illuminating light. The optical member includes a plurality of light guides each having an entrance surface opposed to the light source means, reflecting surfaces for reflecting the light beam which enters the optical member through the entrance surface, and an exit surface opposed to the entrance surface and having an area larger than the entrance surface. The plurality of light guides are adjacently disposed in such a manner that each of air layers is formed in at least part of each area at which the plurality of light guides are adjacent to each other.

24 Claims, 13 Drawing Sheets

ILLUMINATING DEVICE FOR PROJECTING LIGHT

BACKGROUND OF THE INVENTION

1. Field of the Invention

The present invention relates to an illuminating device and a photographing apparatus and, more particularly, to an optical apparatus suitable for efficiently projecting illuminating light (flash light) toward an object in interlocking relation to the photographing operation of a camera body in the state of being fitted in a part of the camera body (the body of the photographing apparatus).

2. Description of Related Art

There are various types of illuminating devices (flash devices) that attach to a part of a camera body and project illuminating light (flash light) toward an object in interlocking relation to the photographing operation of the camera body.

For example, Japanese Laid-Open Utility Model Application No. 57-150826 proposes an illuminating device which is arranged in such a manner that, during use, an emission part is held and fixed at a position distant from the photographing optical axis of a camera, and during nonuse, the emission part is tilted to the front and integrated into the shape of the camera.

Japanese Laid-Open Patent Application No. 59-165037 proposes an illuminating device which is arranged to obtain a predetermined light distribution through a plurality of fiber bundles which are appropriately disposed at a light-gathering portion in which light beams emitted from a flash discharge tube are gathered in a band-like form.

Japanese Laid-Open Patent Application No. 8-234277 proposes an illuminating device which comprises emission means and optical means for projecting light emitted from the emission means onto an object, the optical means being arranged to guide the emitted light through a member in the longitudinal direction thereof and bend and gather the light and project it toward the object. The proposed illuminating device is arranged to guide light emitted from the emission means through the member in the longitudinal direction thereof, and gather the light and project it toward the object, and is, therefore, capable of using light with high efficiency.

In general, it has been desired that an illuminating device (flash device), which is to be attached to a small-size light-weight photographing apparatus such as a camera, have the following features and the like:

(a1) Small size and light weight.

(a2) Illuminating light emitted from light source means can be efficiently projected toward an object.

(a3) The illuminating device is made as distant as possible from the optical axis of a photographing lens for the purpose of preventing a red-eye phenomenon.

BRIEF SUMMARY OF THE INVENTION

It is, therefore, an object of the present invention to further improve the proposed illuminating device of Japanese Laid-Open Patent Application No. 8-234277 and provide an illuminating device suitable for use in a still camera, a video camera and the like, which can project light beams (illuminating light) emitted from light source means toward an object side with high efficiency via a light guide member (optical member) which is appropriately constructed.

Another object of the present invention is to provide a photographing apparatus using such an illuminating device.

The illuminating device according to the present invention comprises light source means and an optical member, the illuminating device being arranged to project a light beam emitted from the light source means, via the optical member as illuminating light, the optical member including a plurality of light guides each having an entrance surface opposed to the light source means, reflecting surfaces for reflecting the light beam which enters the optical member through the entrance surface, and an exit surface opposed to the entrance surface and having an area larger than the entrance surface, the plurality of light guides being adjacently disposed in such a manner that each of air layers is formed in at least part of each area at which the plurality of light guides are adjacent to each other.

More particularly, the illuminating device has the following features and the like.

The air layers extend approximately radially from a center of an emission part of the light source means.

Each of the air layers increases in width from the entrance surface toward the exit surface.

The air layers are respectively formed by V grooves and/or rectangular grooves each of which is provided between adjacent ones of the light guides.

The V grooves or the rectangular grooves are provided in top surfaces or bottom surfaces of the respective light guides.

The V grooves or the rectangular grooves are provided in the top surfaces and the bottom surfaces of the respective light guides in such a manner that the V grooves or the rectangular grooves provided in the top surfaces and those provided in the bottom surfaces are opposed to each other or out of phase with each other in a direction in which the light guides are arrayed.

The reflecting surfaces are total reflection surfaces.

The light source means has a flash discharge tube, and the plurality of light guides are arrayed in a direction of an arc length of the flash discharge tube.

The light source means has a flash discharge tube, and the entrance surfaces of the plurality of light guides are unidimensionally arrayed in a direction of an arc length of the flash discharge tube, while the exit surfaces of the plurality of light guides are adjacently disposed in a vertically staggered manner with respect to the direction of the arc length.

The plurality of light guides are disposed to radially expand from an entrance-surface side toward an exit-surface side.

The reflecting surfaces are top and bottom surfaces and side surfaces, relative to a travelling direction of the light beam, of each of the light guides.

Each of the light guides has a light guide portion whose cross-sectional area perpendicular to a travelling direction of the light beam increases at a constant rate from the entrance surface toward the exit surface.

Each of the light guides has a light guide portion whose cross-sectional area perpendicular to a travelling direction of the light beam increases in the form of a higher-order function from the entrance surface toward the exit surface.

The entrance surface is formed by a plane surface or a curved surface.

Each of the reflecting surfaces is formed by a plane surface or a curved surface.

The exit surface is formed by a plane surface or a curved surface.

The exit surface formed by the plurality of light guides has a central portion centered about an optical axis and formed by a curved surface, and portions distant from the optical axis and formed by plane surfaces or curved surfaces different from the curved surface.

Each of top and bottom surfaces relative to a travelling direction of the light beam is formed by a free curved surface formed by continuously arranging envelopes which connect the entrance surface and the exit surface.

The following condition is satisfied:

$$\alpha \leq 90° - 2 \times \sin^{-1}(1/n),$$

where a represents an inclination, with respect to an optical axis of a central light guide among the plurality of light guides which are adjacently disposed, of a boundary between the central light guide and a light guide provided adjacent to a side surface of the central light guide (if the boundary is a curved surface, an inclination of a tangent to the curved surface) and "n" represents a refractive index of a material of the central light guide.

The above and other objects, features and advantages of the present invention will become apparent from the following detailed description of preferred embodiments of the present invention, taken in conjunction with the accompanying drawings.

DETAILED DESCRIPTION OF THE INVENTION

Preferred embodiments of the present invention will be described below with reference to the accompanying drawings.

Figure 1:
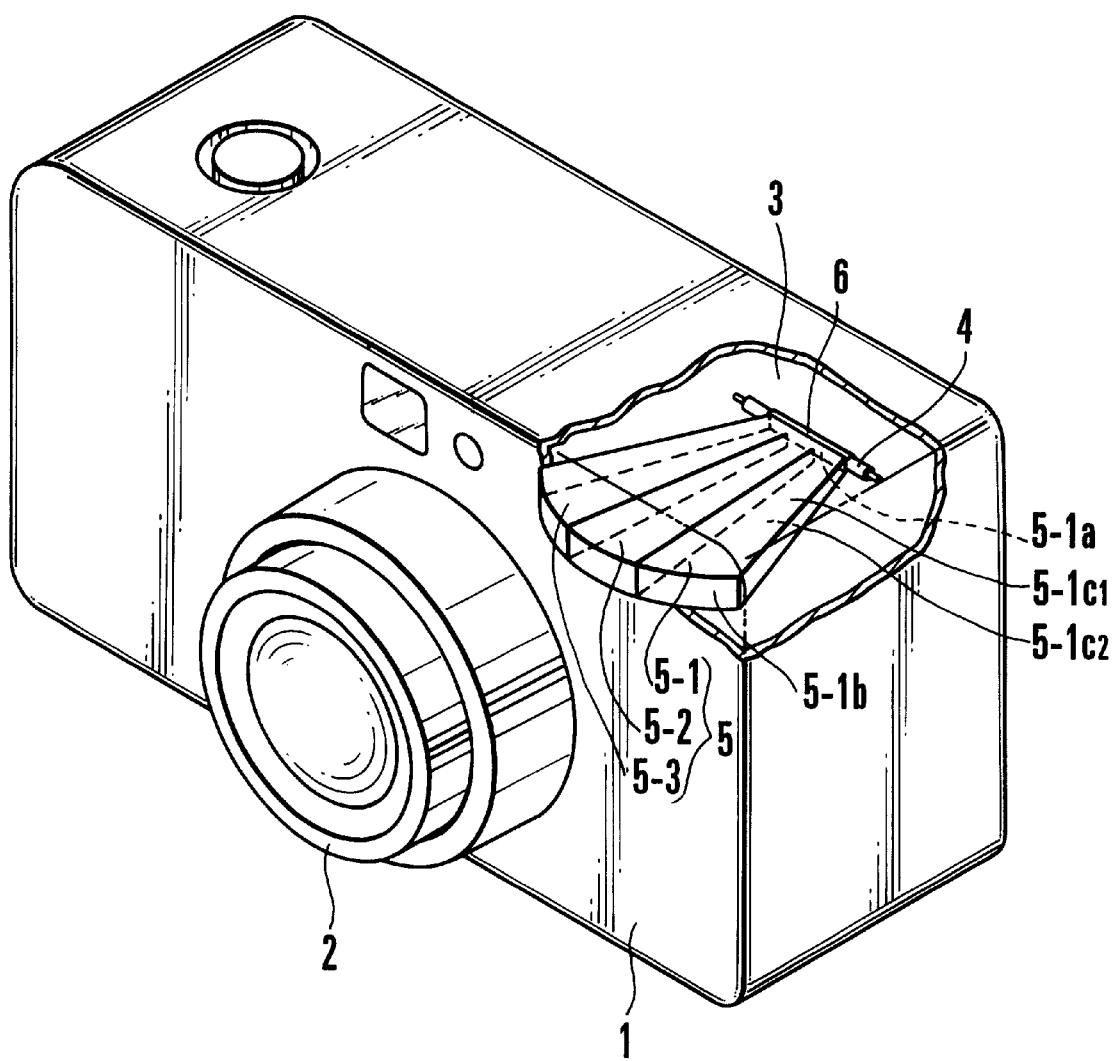
FIG. 1 is a diagrammatic perspective view showing the essential portion of a construction in which an illuminating device according to a first embodiment of the present invention is provided in a top portion of a camera body.
Figure 2:
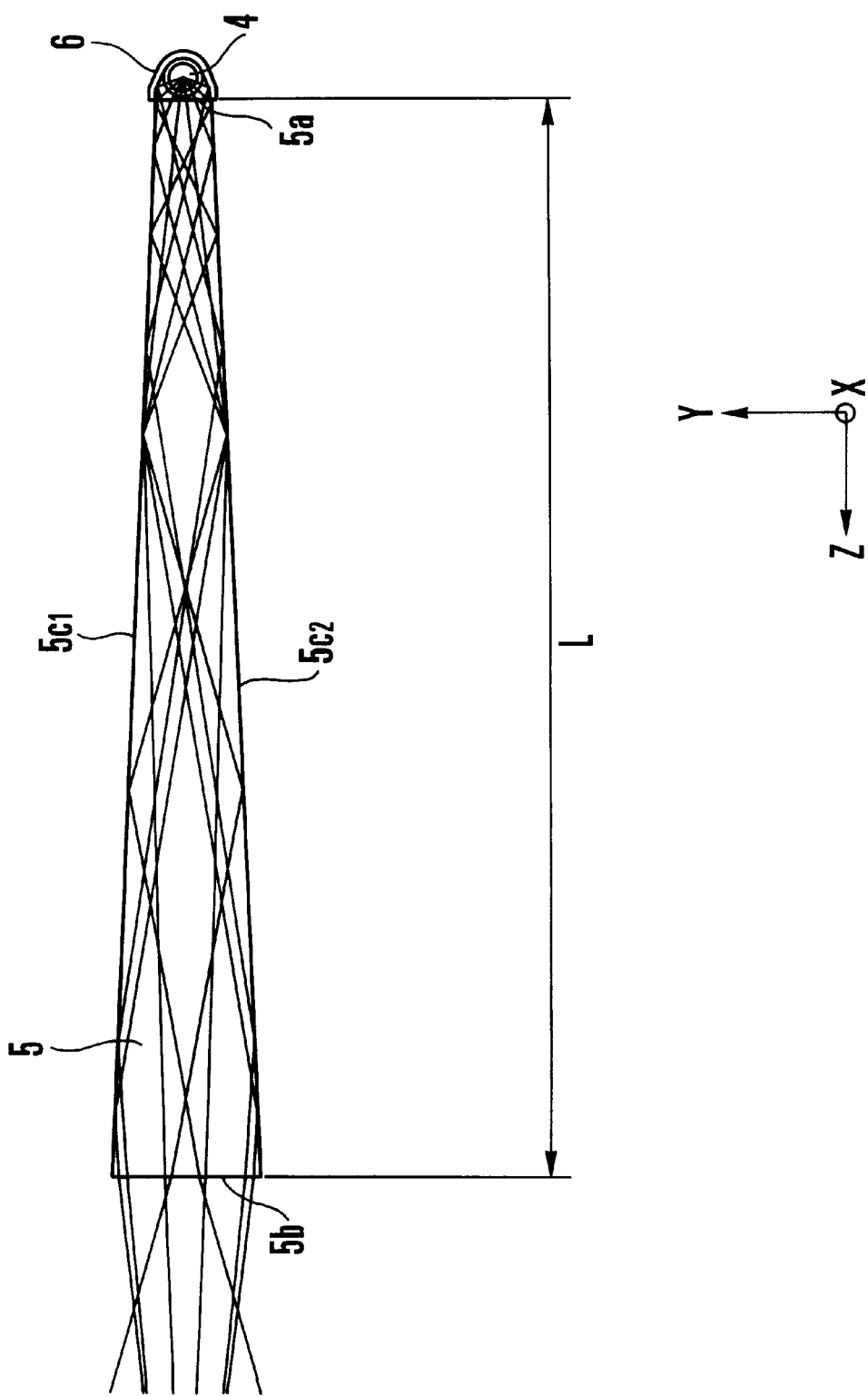
FIG. 2 is a cross-sectional view of the essential portion of the illuminating device shown in FIG. 1.
Figure 3:
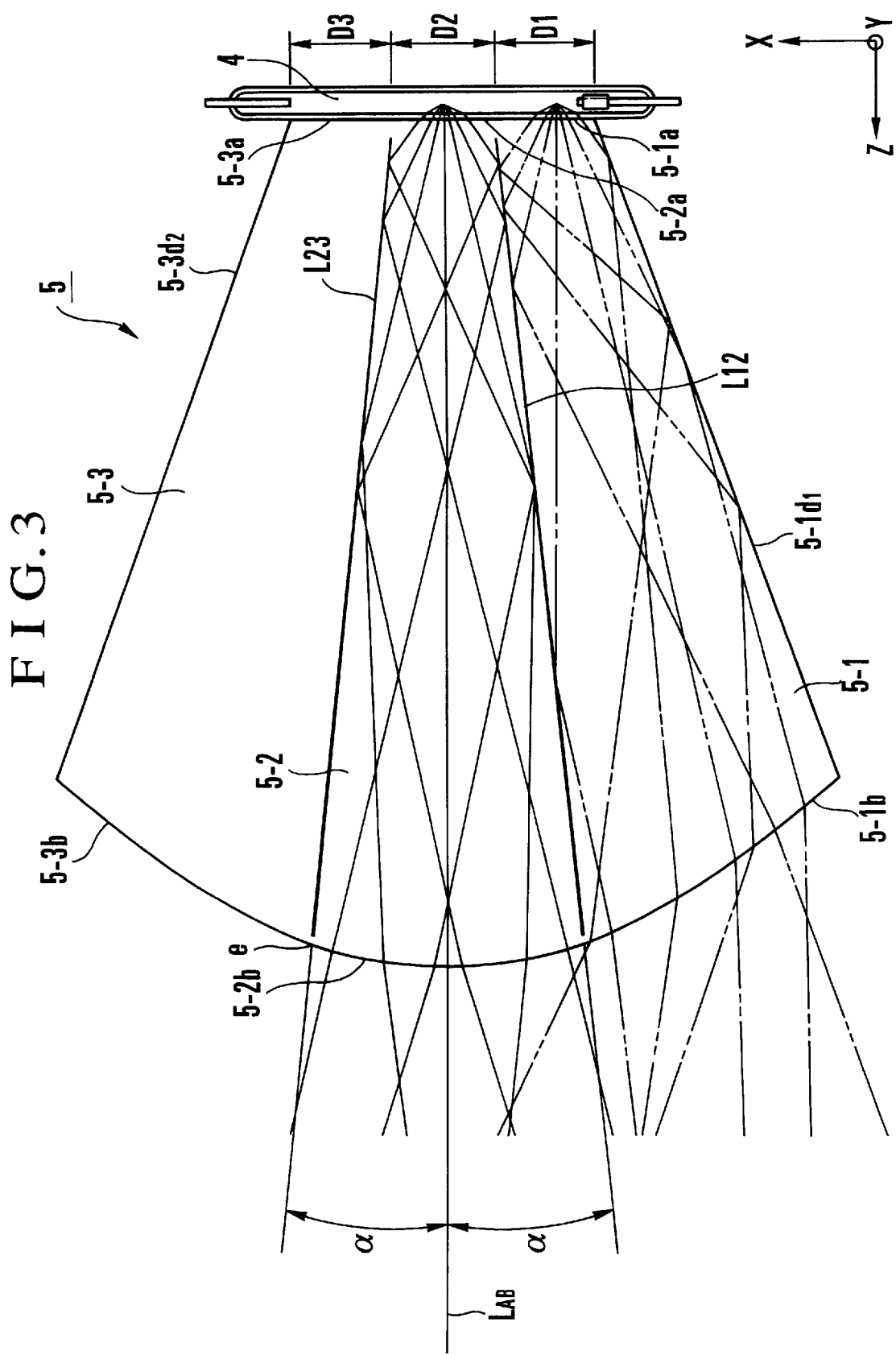
FIG. 3 is a plan view of the essential portion of the illuminating device shown in FIG. 1.

FIG. 1 is a diagrammatic perspective view showing the essential portion of a first embodiment in which an illuminating device according to the present invention is provided in a top portion of the body of a camera (a photographing apparatus). FIGS. 2 and 3 are a cross-sectional view and a plan view showing the essential portions of an optical member 5 for guiding illuminating light beams in the illuminating device shown in FIG. 1.

The camera shown in FIG. 1 includes a camera body 1 (the body of the photographing apparatus) and a lens barrel part 2 which holds a photographing lens. The vertical and horizontal directions of the camera body 1 and the direction of the optical axis thereof will be hereinafter referred to as the Y axis, the X axis and the Z axis, respectively.

An illuminating device (an emission-part unit) 3 is provided in a top right portion of the camera body 1 for sliding movement in the horizontal direction (the X direction) of the camera body 1 or in the vertical direction (the Y direction) of the camera body 1. The illuminating device 3 includes a cylindrical flash discharge tube (a flash emission tube or a flash tube) 4 for emitting flash light as light source means, a reflecting mirror (a reflector) 6 for gathering and reflecting toward an object side the light beams radiated in various directions other than the forward direction from the flash discharge tube 4, for example, the light beams radiated in the rearward direction (in the opposite direction to the object side), the reflecting mirror 6 having a curvature in a one-dimensional direction and making use of internal reflection, and an illuminating-light-beam guiding optical member (a light guide) 5 for gathering both light beams which have entered the optical member 5 directly from the flash discharge tube 4 and the light beams which have entered the optical member 5 after having been reflected from the reflecting mirror 6, and efficiently projecting a light beam of predetermined shape toward the object side.

The construction of the optical member 5 according to the first embodiment will be described below. The optical member 5 according to the first embodiment includes three light guides 5-1, 5-2 and 5-3 each of which performs optical action as a light guide member and is formed to extend in the direction of the optical axis (the Z direction), and air layers (boundaries) L12 and L23 which are formed to extend radially from the emission center of the flash discharge tube (light source means) 4 and arrayed in the horizontal direction (the X direction). The air layers L12 and L23 are formed by V grooves or rectangular grooves provided between each of the light guides 5-1, 5-2 and 5-3 and the adjacent one. Each of the air layers L12 and L23 is fixed and increases in width from an entrance surface 5a toward an exit surface 5b.

In the optical member 5, as shown in FIG. 3, the light guides 5-1 to 5-3 are connected to one another at entrance surfaces 5-1a, 5-2a and 5-3a, and are similarly connected to one another at exit surfaces 5-1b, 5-2b and 5-3b, and each of the air layers L12 and L23 is arranged to be present in only a predetermined portion in the direction of the optical axis. This construction makes it possible to integrally form the optical member 5 by extrusion (injection molding).

Since the entrance surfaces 5-1a, 5-2a and 5-3a are arrayed with a slight gap provided between each of them and the adjacent one and the exit surfaces 5-1b, 5-2b and 5-3b are also arrayed in a similar manner, the entrance surfaces 5-1a, 5-2a and 5-3a and the exit surfaces 5-1b, 5-2b and 5-3b respectively form one entrance surface 5a and one exit surface 5b of the optical member 5, so that effective use of light beams can be realized.

Each of the air layers L12 and L23 has opposite side surfaces (boundary surfaces) each of which is formed as a mirror surface, and light is totally reflected at the side surfaces. Incidentally, the optical member 5 may be formed by independently forming a plurality of light guides and arranging the plurality of light guides in the horizontal direction or the vertical direction (the Y direction) in such a manner that an air layer is formed between each of the light guides and the adjacent one.

In the first embodiment, the optical member 5 is formed by a plurality of (three) light guides (5-1, 5-2 and 5-3), which are arrayed in the direction of the arc length of the flash discharge tube 4. An apparent entrance opening of the entrance surface of the optical member is made narrow to reduce the length of the entire optical member (the length thereof in the Z direction), thereby efficiently guiding illuminating light beams, as will be described later.

The optical member 5 (each of the light guides 5-1, 5-2 and 5-3 which constitute the optical member 5) is made from a plate-shaped transparent member (such as glass or plastics). The optical member 5 is formed to radially expand from the entrance surface 5a toward the exit surface 5b.

The optical member 5 includes the entrance surface 5a (5-1a, 5-2a and 5-3a) which allows light beams emitted from the flash discharge tube 4 to enter the optical member 5, top and bottom surfaces 5c ($5c_1$ and $5c_2$) which serve as reflecting surfaces for totally reflecting the light beams which have passed through the entrance surface 5a (top and bottom surfaces $5-1c_1$ and $5-1c_2$ of the light guide 5-1, top and bottom surfaces $5-2c_1$ and $5-2c_2$ of the light guide 5-2, and top and bottom surfaces $5-3c_1$ and $5-3c_2$ of the light guide 5-3), side surfaces 5d ($5d_1$ and $5d_2$) (side surfaces 5-1d and $5-1d_2$ of the light guide 5-1, side surfaces 5-2d$_1$ and $5-2d_2$ of the light guide 5-2, side surfaces $5-3d_1$ and $5-3d_2$ of the light guide 5-3), and the exit surface 5b (5-1b, 5-2b and 5-3b) for allowing both light beams guided directly from the optical member 5 and light beams guided after having been totally reflected once or repeatedly at the top and bottom surfaces 5c and the side surfaces 5d to exit toward the object side.

The portion between the entrance surface 5a and the exit surface 5b serves as a light guide portion. The entrance surface 5a and the exit surface 5b are opposed to each other. Each of the entrance surface 5a and the exit surface 5b is formed of a plane surface or a curved surface having a curvature for a positive or negative refractive power (the term "curved surface" used herein signifies a spherical surface, an aspherical surface, an ellipsoidal surface, a quadratic surface, a cylindrical surface, a toric surface and the like).

A part of the entrance surface 5a and/or the exit surface 5b may be formed as a curved surface, and the other part as a plane surface. The exit surface 5b has a portion centered about the optical axis and formed as a curved surface, and portions distant from the optical axis and formed as plane surfaces or other surfaces different from the curved surface.

Each of the top and bottom surfaces $5c_1$ and $5c_2$ is formed of a plane or curved surface. For example, each of the top and bottom surfaces $5c_1$ and $5c_2$ is made from a free curved surface (a surface of arbitrary shape) which is formed by continuously arranging envelopes which connect the entrance surface 5a and the exit surface 5b. Each of the side surfaces $5d_1$ and $5d_2$ is formed of a plane or curved surface which expands with a predetermined angle with respect to the entrance surface 5a.

The shapes of the entire optical member 5 and each of the light guides 5-1, 5-2 and 5-3 are such that the exit area of the exit surface 5b (5-1b, 5-2b and 5-3b) is large compared to the entrance area of the entrance surface 5a (5-1a, 5-2a and 5-3a). For example, the XY cross-sectional shape of the optical member 5 is such that the distance between the side surfaces $5d_1$ and $5d_2$ and/or the distance between the top and bottom surfaces $5c_1$ and $5c_2$ increases gradually or at a constant rate from the entrance surface 5a toward the exit surface 5b.

Specifically, the light guide portion of the optical member 5 has an XY cross-sectional area which increases at a constant rate or in the form of a higher-order function.

Incidentally, in the first embodiment, the illuminating device 3 may be provided in a side portion of the camera body 1 for sliding movement in the vertical direction (the Y direction) or in the horizontal direction (the X direction).

In the illuminating device 3 of the first embodiment, as shown in FIG. 3, the light beams emitted from the respective areas of the flash discharge tube 4 are, directly or after having been reflected at the reflecting mirror 6, guided to the entrance surface 5a (5-1a, 5-2a and 5-3a) of the optical member 5 (the light guides 5-1, 5-2 and 5-3). Some of the light beams which have been incident on the entrance surface 5a travel rectilinearly and are guided to the exit surface 5b, while the other light beams are totally reflected by the top and bottom surfaces 5c and/or the side surfaces 5d and are guided to the exit surface 5b (5-1b, 5-2b and 5-3b).

In this manner, after total reflection has been repeated at the internal surfaces of the optical member 5, an illuminating light beam of high intensity having a predetermined shape (for example, a square in XY cross section and a rectangle which is longer in the direction of the X axis) is projected onto the object from the exit surface 5b.

In particular, the diametrical (Y-direction) light beams of the light beams from the flash discharge tube 4 are repeatedly totally reflected at the top and bottom surfaces $5c_1$ and $5c_2$, while the axial (X-direction) light beams are made to efficiently exit by the refraction of the curved surface of the exit surface 5b and projected toward the object side.

In the first embodiment, the optical member 5 is composed of a plurality of light guides, and the lengths of the light guide portions of the light guides (the lengths in the Z direction) are substantially increased to increase the number of total reflections of light beams entering from the entrance surface 5a, thereby achieving efficient light distribution.

The entrance surface 5a of the optical member 5 has a rectangular shape, and the length in the X-axis direction of the entrance surface 5a is slightly longer than the effective arc length in the X-axis direction of the flash discharge tube 4, while the length in the Y-axis direction of the entrance surface 5a is approximately the same as the width of the opening of the reflecting mirror 6 to such an extent that no gap occurs between the entrance surface 5a and the opening of the reflecting mirror 6. Thus, the light beams emitted from the flash discharge tube 4 are efficiently taken in from the entrance surface 5a. The exit surface 5b has a rectangular opening similar to the entrance surface 5a.

The construction of the optical member 5 according to the first embodiment will be described below. In the first embodiment, the boundary L12 between the light guide (central light guide) 5-2 and the light guide 5-1 and the boundary L23 between the central light guide 5-2 and the light guide 5-3 have the following relation:

$$\alpha \leq 90° - 2\sin^{-1}(1/n),$$

where α represents the angle of each of the boundaries L12 and L13 with an optical axis $L_{AB}$ (the central axis of the optical member 5) (if each of the boundaries has a curved surface, the inclination of a tangent to the curved surface), and n represent the refractive index of the material of the optical member 5.

The above relation is the condition required to prevent light beams from entering from either of the outside (right and left) light guides (areas) 5-1 and 5-3 into the central light guide (area) 5-2 even if the light beams entering from the entrance surface 5a have any angular components.

The light-gathering characteristics of the respective light guides 5-1, 5-2 and 5-3 are independently controlled by satisfying the above condition. Although the light-gathering characteristics depend on this angle setting and lengths L of the respective light guides 5-1, 5-2 and 5-3, there is a method of making the illumination areas of the three light guides coincident with one another by controlling the light-gathering characteristics by using the horizontal opening of the entrance surface 5a. Specifically, the ratio of a length D2 of the entrance surface 5-2a of the light guide 5-2 to each of lengths D1 and D3 of the entrance surfaces 5-1a and 5-3a of the marginal light guides 5-1 and 5-3 is appropriately selected to make the illumination areas of the three light guides coincident with one another.

The direction of exiting is controlled by a curved shape provided on the exit surface 5b. Specifically, the curved shape is formed so that marginal components, after having exited from the exit surface 5b, are uniformly distributed in the horizontal direction with respect to the center of the angle of view. If the curvature of the curved surface of the exit surface 5b is made excessively large, loss due to total reflection occurs at this curved surface and light beams are partly reflected backward. Therefore, by taking such condition into account as well, the curved shape of each of the exit surfaces 5-1b, 5-2b and 5-3b is determined so that almost all the light beams can exit from the exit surface 5b.

In the optical member 5 shown in FIG. 3, the three light guides 5-1, 5-2 and 5-3 are integrated by being partly connected to one another, and actually, as the result of an extraction process, slit portions which form the respective air layers become gradually wider from the entrance surface 5a toward the exit surface 5b.

In the first embodiment, the optical member may be composed of multiple separate portions in such a manner that a plurality of light guides are disposed adjacent to one another in the optical member so that light can be efficiently gathered. In this construction, each of the light guides may be disposed close to the adjacent one, because there is no substantial problem in that the area of contact between the adjacent light guides is slight owing to their surface roughness.

In the first embodiment, the curved surface of the exit surface 5b is determined in such a manner that its curvature is set so that if uniform diffused light enters from the entrance surface 5a, the light is controlled and gathered by the left and right boundaries L12 and L23 and reaches the exit surface 5b, and the light at a point "e" of each of the boundaries L12 and L23 of the exit surface 5b has a distribution spread in the rightward and leftward directions over approximately equal angles.

The curvature of each of the exit surfaces 5-1b and 5-3b of the marginal light guides (light guide portions) 5-1 and 5-3 is selected so that the following two conditions can be balanced, i.e., the condition that the exit angle at each end of each of the light guides 5-1 and 5-3 has rightward and leftward angular extents which are approximately equal to each other, and the condition that the loss of the amount of light due to total reflection at the exit surface can be reduced as greatly as possible because the light is reflected backward by such total reflection if the curvature is excessively large in an outer marginal portion.

The length of the inlet (horizontal length) of the entrance surface 5a of the optical member 5 is set to be approximately the same as or slightly longer than the effective arc length of the flash discharge tube 4 so that light can efficiently enter the optical member 5 and the shape of the optical member 5 can be minimized.

Figure 4:
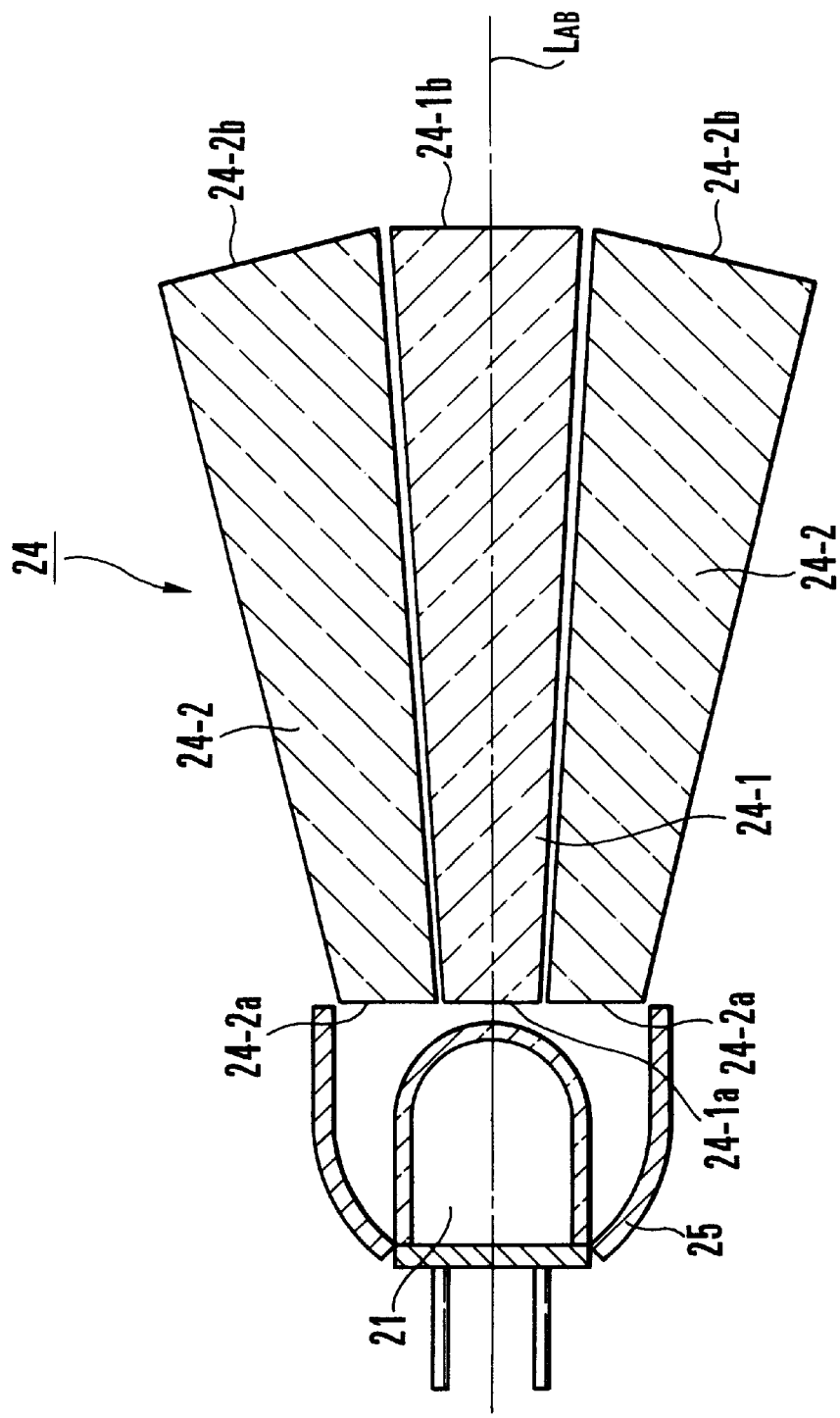
FIG. 4 is a diagrammatic cross-sectional view of the essential portion of an illuminating device according to a second embodiment of the present invention.
Figure 5:
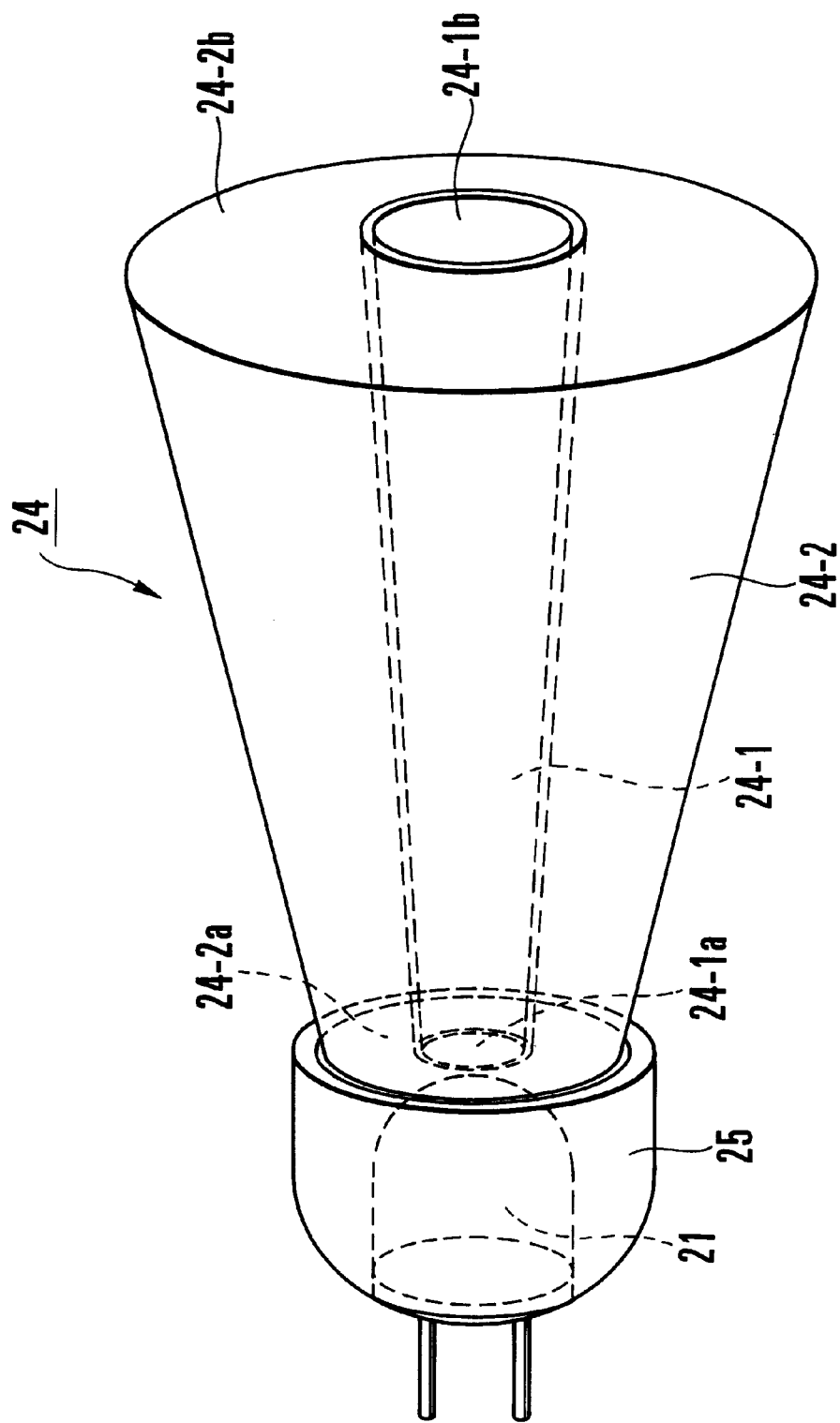
FIG. 5 is a diagrammatic perspective view of the essential portion of the illuminating device according to the second embodiment of the present invention.

FIGS. 4 and 5 are a diagrammatic cross-sectional view and a diagrammatic perspective view showing an illuminating device according to a second embodiment of the present invention. The second embodiment uses a light source 21 having an emission part having a rotationally symmetrical shape such as a spherical or circular shape, and is arranged to gather light beams emitted from the light source 21 by means of an optical member 24 and project the gathered light beams toward an object.

The optical member 24 includes a light guide 24-1 having a conical shape and a light guide 24-2 having a shape which surrounds the light guide 24-1 with an air layer interposed therebetween. A reflecting mirror (reflector) 25 is arranged to reflect and gather light beams emitted from the light source 21 and guide them to the optical member 24.

In the second embodiment, from among the light beams emitted from the light source 21 which has not a cylindrical shape such as the aforesaid one but a spot-like shape, the light beams which travel in a central portion centered about the optical axis $L_{AB}$ are guided through the light guide 24-1, while the light beams which diverge in directions away from the optical axis $L_{AB}$ are guided through the light guide 24-2. The light beams thus guided exit from exit surfaces 24-1b and 24-2b. The exit surface 24-1b of the light guide 24-1 is made from a plane surface or a curved surface. The exit surface 24-2b of the outer light guide 24-2 is made from a curved surface which bends the light beams toward the optical axis $L_{AB}$.

The light guide 24-1 has an approximately columnar shape and the light guide 24-2 has a hollow conical shape. The light guides 24-1 and 24-2 are shaped in such a manner that the areas of the respective exit surfaces 24-1b and 24-2b are larger than the areas of the corresponding entrance surfaces 24-1a and 24-2a. The optical member 24 having the above-described construction according to the second embodiment is capable of achieving an effect similar to that of the first embodiment.

Figure 6:
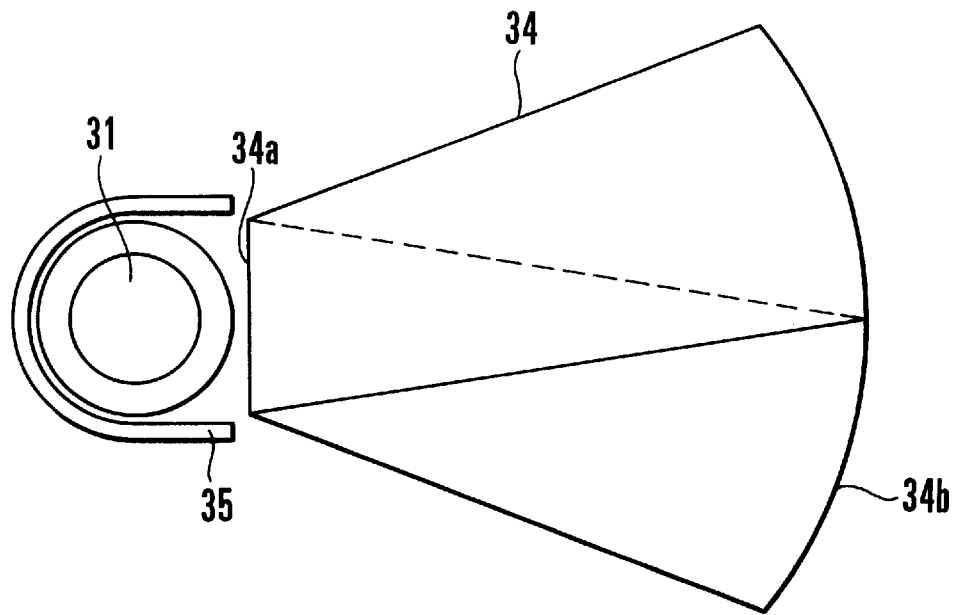
FIG. 6 is a diagrammatic cross-sectional view of the essential portion of an illuminating device according to a third embodiment of the present invention.
Figure 7:
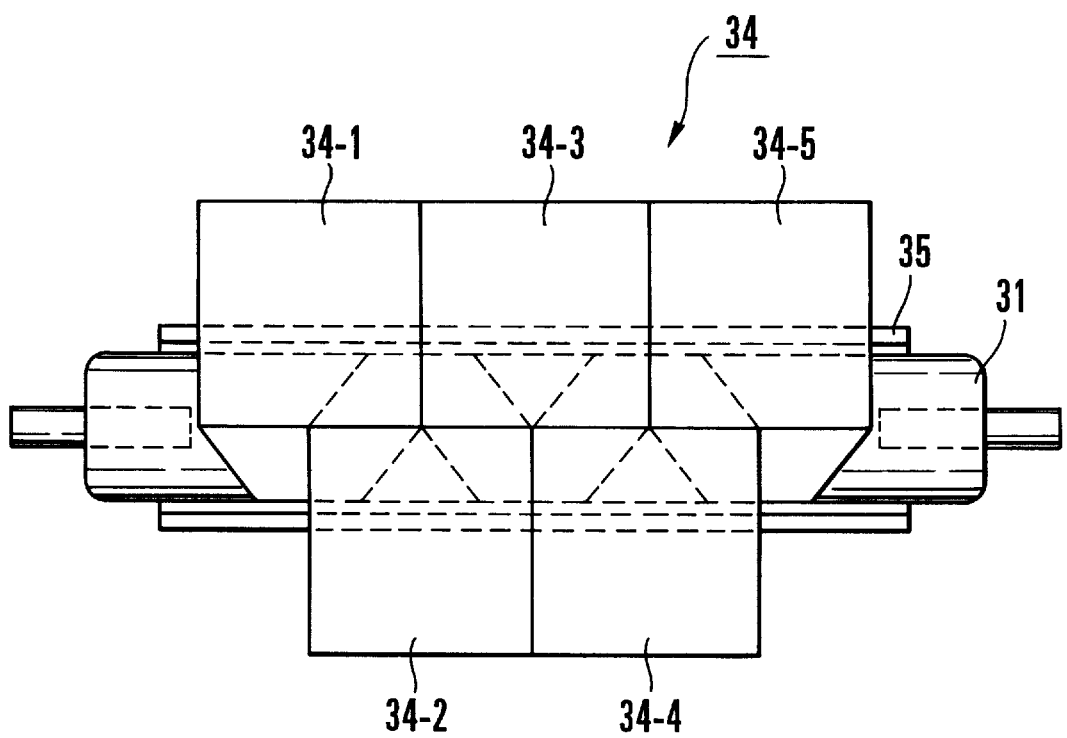
FIG. 7 is a diagrammatic front view of the essential portion of the illuminating device according to the third embodiment of the present invention.

FIGS. 6 and 7 are a diagrammatic cross-sectional view and a diagrammatic front view showing an illuminating device according to a third embodiment of the present invention.

An optical member 34 includes five light guides 34-1 to 34-5 which are separated from one another by air layers. Entrance surfaces 34-1a to 34-5a are arrayed unidimensionally in the direction of the arc length of a discharge tube 31, while exit surfaces 34-1b to 34-5b are adjacently arrayed in a so-called staggered manner, i.e., in such a manner as to be vertically alternately located with respect to the direction of the arc length of the discharge tube 31. This construction makes it possible to reduce the horizontal length of the optical member 34. Incidentally, the number of light guides is not limited to five, and a plurality of light guides need only to be provided.

An entrance surface 34a of the five light guides 34-1 to 34-5 is horizontally located in one plane in opposition to the discharge tube 31 so that light beams can be effectively made incident on the entrance surface 34a. The entrance surface 34a is made from a plane or curved surface. An exit surface 34b of the five light guides 34-1 to 34-5 is made from a plane or curved surface. A reflecting mirror 35 is disposed around the discharge tube 31.

Each of the light guides 34-1 to 34-5 is shaped in such a manner that the area of the exit surface 34b (34-1b to 34-5b) is larger than the area of the entrance surface 34a (34-1a to 34-5a). The shape of each of the light guides 34-1 to 34-5 is approximately the same as that shown in FIG. 3 which shows the first embodiment.

In the third embodiment, light beams emitted from the discharge tube 31 are formed into an illuminating beam of appropriate shape via the five light guides 34-1 to 34-5 of the optical member 34 and the illuminating beam is projected toward an object, whereby it is possible to achieve an effect similar to that of the first embodiment.

Figure 8:
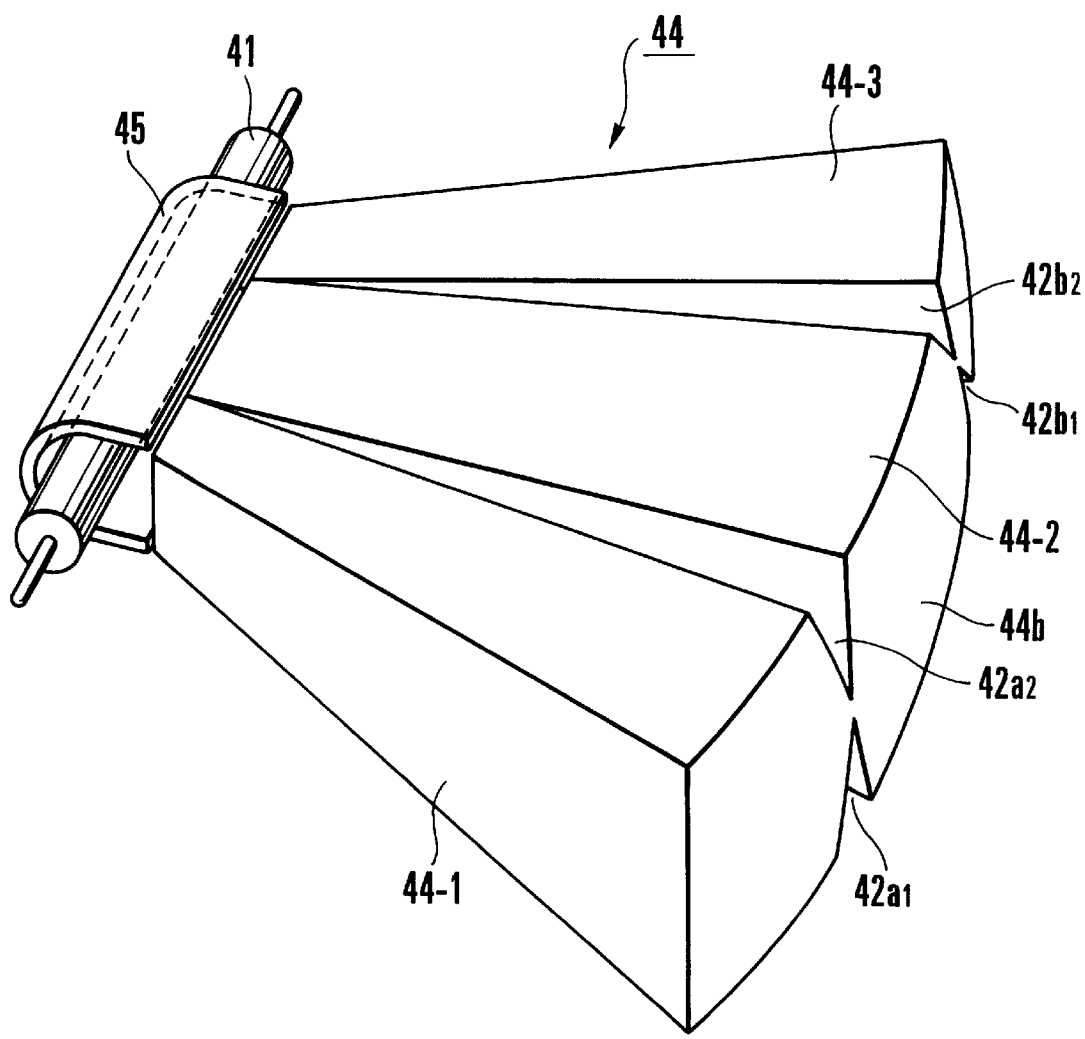
FIG. 8 is a diagrammatic perspective view of the essential portion of an illuminating device according to a fourth embodiment of the present invention.

FIG. 8 is a diagrammatic perspective view showing the essential portion of an illuminating device according to a fourth embodiment of the present invention. The fourth embodiment includes an optical member 44, a flash discharge tube 41 and a reflecting mirror 45. The optical member 44 according to the fourth embodiment is similar to the optical member 5 according to the first embodiment shown in FIG. 3, but a plurality of V grooves are formed in such a manner that opposed V grooves $42a_1$ and $42a_2$ ($42b_1$ and $42b_2$) respectively extend in the top and bottom surfaces of the optical member 44 in radial directions from the emission surface of the flash discharge tube 41. Thus, a plurality of light guides 44-1, 44-2 and 44-3 are formed with air layers interposed between each of them and the adjacent one. (Although FIG. 8 shows three light guides, the number of light guides is not limited to three.) Although the plurality of light guides 44-1, 44-2 and 44-3 are connected in their central portions, they may be disposed separately and independently. The width (and/or the depth) of each of the V grooves becomes gradually larger from the entrance surface toward an exit surface 44b. The V grooves may be formed to extend into an intermediate area inward of the exit surface 44b. The V grooves may also be formed in at least one of the top and bottom surfaces. Rectangular grooves (recessed grooves) may be provided instead of the V grooves. The other construction is similar to that of the first embodiment.

Figure 9A:
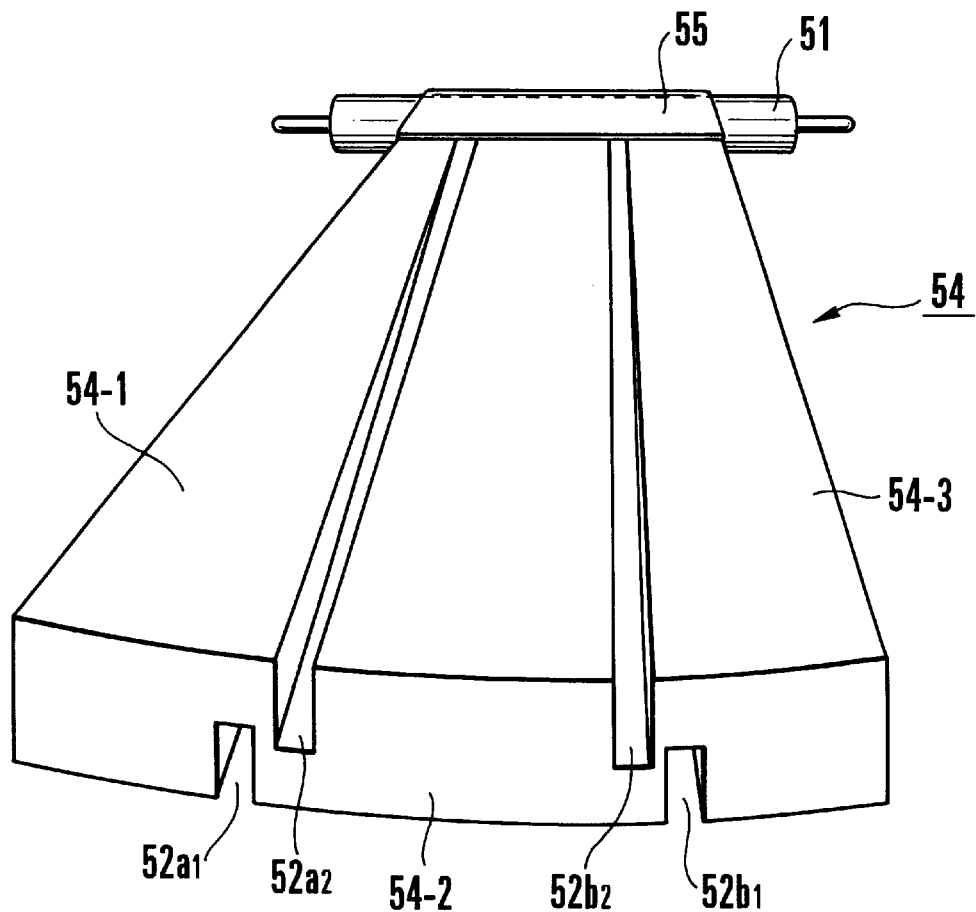
FIGS. 9A and 9B are a diagrammatic perspective view and a diagrammatic front view of the essential portion of an illuminating device according to a fifth embodiment of the present invention.
Figure 9B:
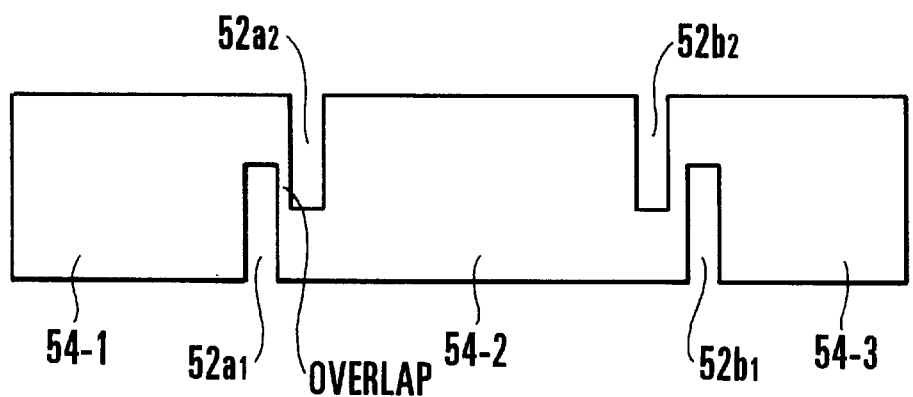

FIGS. 9A and 9b are a diagrammatic perspective view and a diagrammatic front view showing the essential portion of an illuminating device according to a fifth embodiment of the present invention. The fifth embodiment includes an optical member 54, a discharge tube 51 and a reflecting mirror 55. The optical member 54 according to the fifth embodiment is similar to the optical member 5 according to the first embodiment shown in FIG. 3, but a plurality of rectangular grooves (recessed grooves) are formed in the top and bottom surfaces of the optical member 54 in such a manner that rectangular grooves $52a_1$ and $52a_2$ ($52b_1$ and $52b_2$) are alternately out of phase in the X direction. Thus, a plurality of (two or more) light guides 54-1, 54-2 and 54-3 are formed with overlaps and air layers interposed between each of them and the adjacent one.

In the fifth embodiment, V grooves may be provided instead of the rectangular grooves (rectangular grooves). The other construction is similar to that of the first embodiment.

Figure 10:
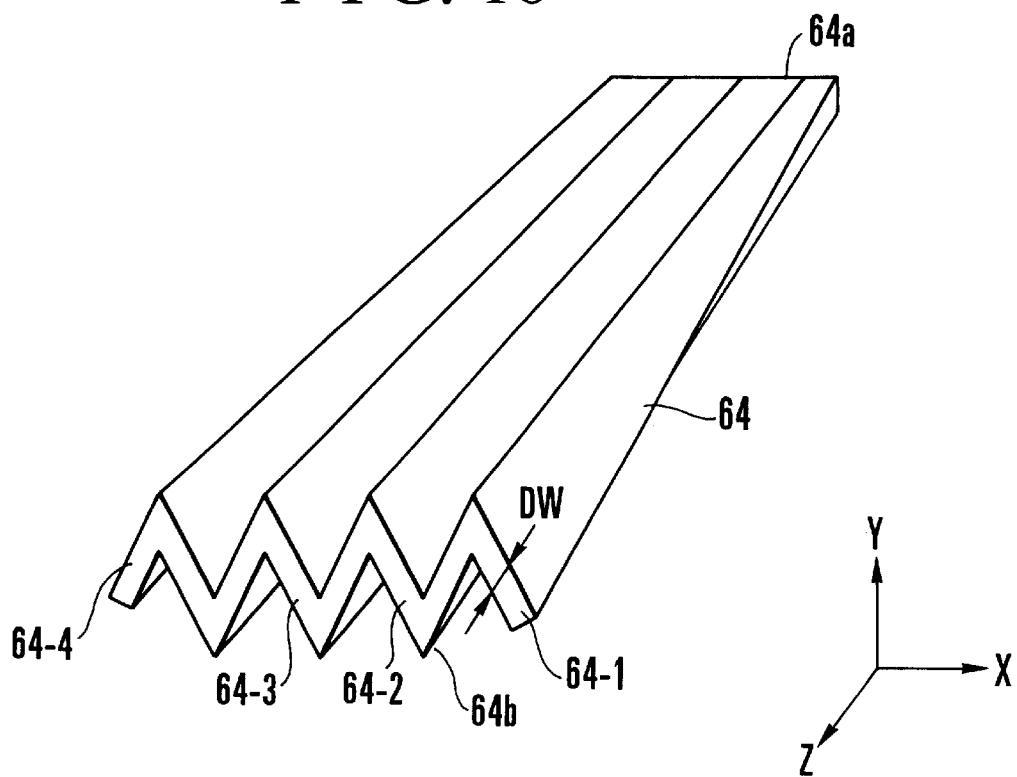
FIG. 10 is a diagrammatic perspective view of the essential portion of an optical member according to a sixth embodiment of the present invention.
Figure 11:
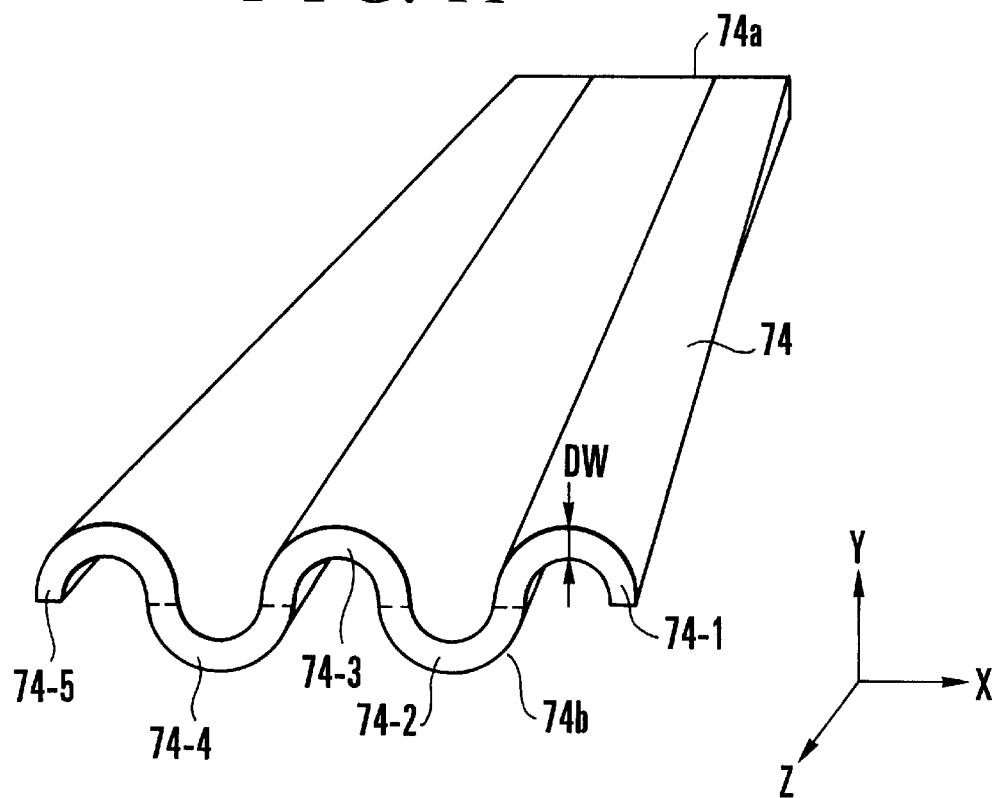
FIG. 11 is a diagrammatic perspective view of the essential portion of an optical member according to a seventh embodiment of the present invention.

FIGS. 10 and 11 are diagrammatic perspective views showing optical members according to sixth and seventh embodiments of the present invention, respectively.

In the sixth embodiment shown in FIG. 10, an optical member 64 includes an entrance surface 64a having a rectangular opening which is elongated in the X direction and an exit surface 64b which has a triangular shape having a predetermined width DW, so that the optical member 64 is composed of a plurality of light guides 64-1 to 64-4 which are arrayed in the X direction at a predetermined period.

In the sixth embodiment, part of light beams which advance in the horizontal (X) direction are converted into light beams which travel in the vertical (Y) direction, so that a light-gathering action and light distribution can be appropriately effected at the same time. Incidentally, each of the entrance surface 64a and the exit surface 64b may be made from a plane or curved surface.

In the seventh embodiment shown in FIG. 11, an optical member 74 includes an entrance surface 74a having a rectangular opening which is elongated in the X direction and an exit surface 74b which has a semi-circular shape having a predetermined width DW, so that the optical member 74 is composed of a plurality of light guides 74-1 to 74-5 which are arrayed in the X direction at a predetermined period.

In the seventh embodiment, part of light beams which advance in the horizontal (X) direction are converted into light beams which travel in the vertical (Y) direction, so that a light-gathering action and light distribution can be appropriately effected at the same time. Incidentally, each of the entrance surface 74a and the exit surface 74b may be made from a plane or curved surface.

Further embodiments of the present invention will be described below. Similar to the above-described embodiments, in any of the following embodiments, the exit surface is larger than the entrance surface.

Figure 12:
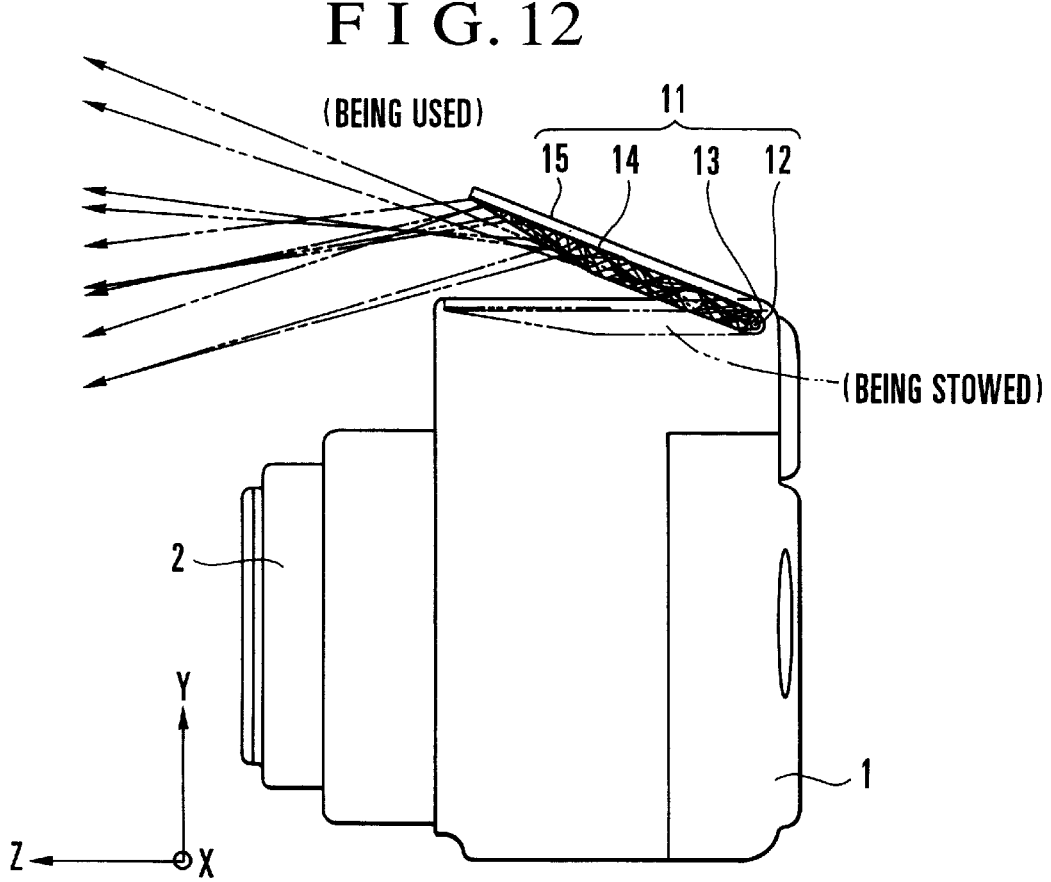
FIG. 12 is a diagrammatic view of the essential portion of a construction in which an illuminating device according to an eighth embodiment of the present invention is applied to a camera.
Figure 13:
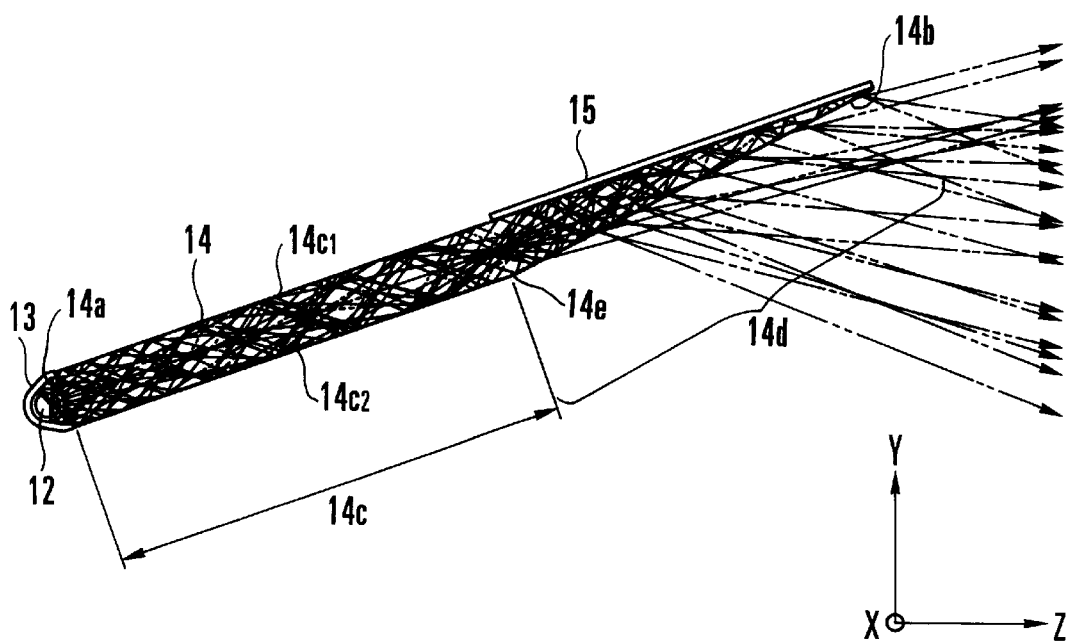
FIG. 13 is an explanatory view of the illuminating device shown in FIG. 12.
Figure 14:
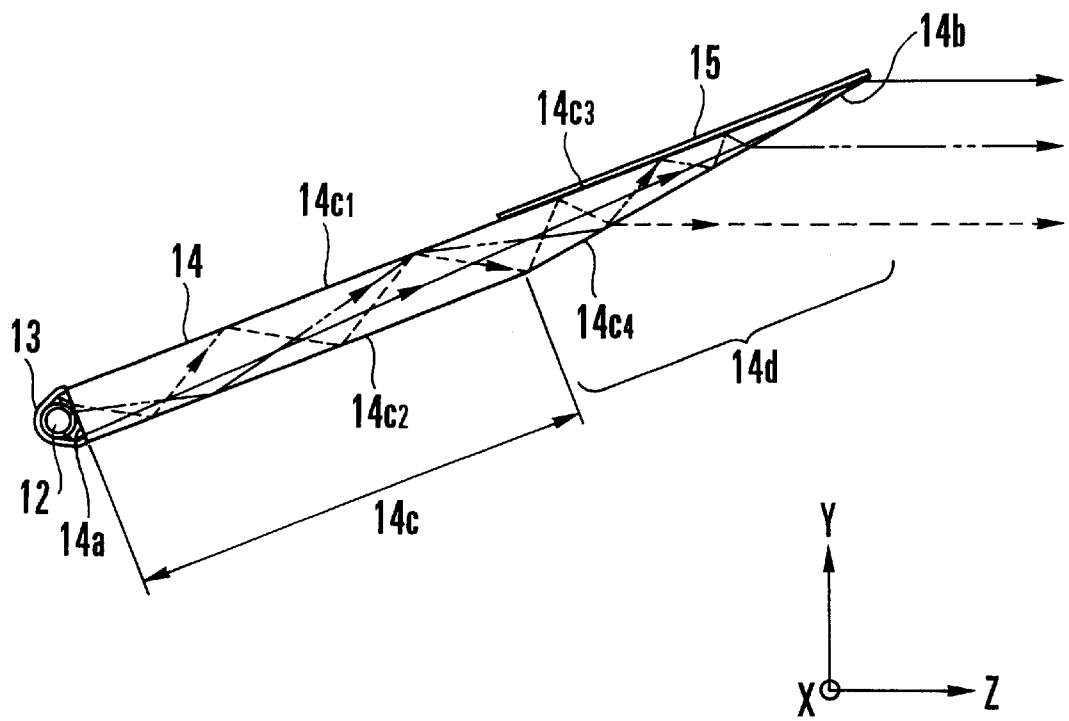
FIG. 14 is an explanatory view of the illuminating device shown in FIG. 12.

FIG. 12 is a diagrammatic view showing the essential portion of an eighth embodiment in which an illuminating device according to the present invention is applied to a camera (a photographing apparatus). FIGS. 13 and 14 are diagrammatic views showing the essential portion of the illuminating device shown in FIG. 12.

The camera shown in FIG. 12 includes the camera body 1 (the body of the photographing apparatus) and the lens barrel part 2 which holds a photographing lens. The vertical and horizontal directions of the camera body 1 and the direction of the optical axis thereof will be hereinafter referred to as the Y axis, the X axis and the Z axis, respectively.

An illuminating device 11 is provided in a top portion of the camera body 1 for rotation about a rotating shaft (not shown) in a YZ cross-section. Two-dot chain lines show the retracted state in which the illuminating device 11 is rotated down to the top of the camera body 1.

A flash discharge tube (a flash emission tube or a flash tube) 12 serves as light source means, and has an arc length (an emission part) which is elongated in the X direction. A reflecting mirror (a reflector) 13 has a reflecting surface formed of a cylindrical surface, and gathers and reflects toward an object side the light beams radiated in various directions other than the forward direction of the flash discharge tube 12, for example, the light beams radiated in the opposite direction of the object side.

A flat optical member (a light guide member) 14 is made of a light transmission material for guiding illuminating light beams, and, as will be described later, has a light guide portion (a light guide area) 14c for guiding illuminating light beams which have entered the optical member 14 from an entrance surface 14a, and an exit area 14d for projecting the illuminating light beams toward the object side. The thickness of the exit area 14d gradually decreases in XY cross section in a direction away from the entrance surface 14a. An exit surface 14b is larger than the entrance surface 14a, and is formed of a plane surface or a curved surface (the term "curved surface" used herein signifies a spherical surface, an aspherical surface, a quadratic surface, a cylindrical surface, a toric surface and the like).

In the eighth embodiment, each of top and bottom surfaces $14c_1$ and $14c_2$ of the light guide portion 14c is formed of a plane or curved surface which uses total reflection, but Al (aluminum), Ag (silver) or the like may be evaporated onto the plane or curved surface so that mirror reflection can be used.

A reflecting plate 15 is provided in proximity to a surface $14c_3$ which is opposed to the exit surface 14b in the exit area 14d of the optical member 14. Incidentally, the surface $14c_3$ may be coated with a reflecting film (a metallic reflecting film) instead of the reflecting plate 15.

Illuminating light beams emitted from the light source 12 enter the optical member 14 through the entrance surface 14a, and part of the light beams are guided directly to the exit area 14d, while the other light beams are repeatedly totally reflected (and/or mirror-reflected) at the top and bottom surfaces $14c_1$ and $14c_2$ of the light guide area 14c and are guided to the exit area 14d. Thus, the light beams which exit directly from the exit area 14d through the exit surface 14b (the light beams which have been totally reflected at the top surface $14c_3$ and a bottom surface $14c_4$ of the exit area 14d) and the light beams which pass through the surface $14c_3$ and are again made incident on the surface $14c_3$ after having been reflected at the reflecting plate 15 are both projected from the exit surface 14b toward the object side. At this time, the exit surface 14b serves as a spot light source.

FIG. 12 shows the state in which the illuminating device 11 is in use, and in this state, the exit surface 14b is inclined by a predetermined angle with respect to the Z axis. When not in use, the illuminating device 11 is rotated about the rotational shaft and retracted to a position where it covers part of the camera body 1 as shown by the two-dot chain lines.

In the eighth embodiment, when the illuminating device is in use, the exit surface 14b is inclined with respect to the camera body 1 and is opposed to the object side, so that the exit surface 14b becomes wider in the exit area and closer to a surface light source.

Thus, an efficient illumination effect can be obtained, and since light beams exit from a wide surface, high directionality can also be obtained. Light-gathering characteristics depend on the proportion in which the light guide portion 14c becomes thinner. If the proportion gradually changes over a wide area, the directionality of the light beams is high. However, if the exit surface 14b is narrow, the directionality of the light beams is low and the light beams exit from the exit surface 14b as diffused components.

In the eighth embodiment, the thickness (the length in the Y direction) of the optical member 14 starts to vary from an approximate center of the optical member 14 in the Z direction, as shown in FIG. 13 by way of example.

As shown in FIG. 13, the exiting of light beams starts occurring at a point 14e (a position in the Z direction) which immediately follows the starting point of a thickness variation. As shown in FIG. 13, the position 14e at which the exiting of light beams starts occurring is made distant from an illuminating source, thereby preventing a red-eye phenomenon during photography.

The entrance surface 14a of the optical member 14 has a rectangular shape, and the length of the entrance surface 14a in the X-axis direction (the direction of the arc length of the flash discharge tube 12) is slightly longer than the effective arc length in the X-axis direction of the flash discharge tube 12, while the length in the Y-axis direction of the entrance surface 14a is approximately the same as the length of the opening of the reflecting mirror 13 to such an extent that no gap occurs between the entrance surface 14a and the opening of the reflecting mirror 13.

Thus, the light beams emitted from the flash discharge tube 12 are efficiently taken in from the entrance surface 14a. The length in the X direction of the exit surface 14b is longer than that of the entrance surface 14a. The YZ cross section of the light guide area 14c (the cross section thereof in the advancing direction of light beams) has a rectangular shape, and the XY cross-sectional area of the light guide area 14c (the cross-sectional area thereof perpendicular to the advancing direction of light beams) is constant. The YZ cross section of the exit area 14d has a pointed shape such as a triangle having an acute vertex, and the XY cross-sectional area of the exit area 14d gradually decreases in a direction away from the entrance surface 14a.

The feature of the optical member 14 of the eighth embodiment will be described below with reference to FIGS. 13 and 14. FIG. 13 also shows the ray traces of rays emitted from the center of the flash discharge tube 12. Almost all the components of the light emitted from the flash discharge tube 12 are made incident on the entrance surface 14a of the light guide member 14 directly or after having been reflected by the reflecting mirror 13. The thickness of the light guide member 14 (the length thereof in the Y-axis direction) does not vary in the light guide area 14c shown in FIG. 13, so that the angular components of the light at the time of incidence on the entrance surface 14a are retained while the light is passing through the cross section of the light guide area 14c.

Then, when the light enters the exit area 14d in which the thickness of the light guide member 14 starts to vary gradually from the point 14e, the angular components at the time of incidence vary and components are produced which tend to pass through the optical member 14 without being totally reflected. Components having larger incident angles at the time of incidence exhibit such characteristics earlier, whereas if components enter the light guide member 14 at small incident angles, the components exhibit the characteristics after a number of reflections in the exit area 14d.

The number of total reflections in the exit area 14d or the number of reflections at the reflecting plate 15 are determined for each of the incident angular components at the time of incidence so that approximately equal angular components exit from the exit area 14d into an air layer.

FIG. 14 is an explanatory view of an optical path, and shows the above-described state more clearly. In FIG. 14, a dashed line represents a component (light beam) having a large incident angle, a two-dot chain line represents a component having a moderate incident angle, and a solid line represents a component having a small incident angle.

The component having the large incident angle, after having been reflected twice at the top and bottom surfaces $14c_3$ and $14c_4$, exits from the exit area 14d which gradually decreases in thickness. The component having the moderate incident angle shown by the two-dot chain line enters the exit area 14d, and exits therefrom after having been reflected a total of four times at the top and bottom surfaces $14c_3$ and $14c_4$. The component having the small incident angle shown by the solid line enters the exit area 14d, and exits therefrom after having been reflected a total of six times at the top and bottom surfaces $14c_3$ and $14c_4$.

As described above, although the number of total reflections differs among the components within the exit area 14d, the components can exit from the exit area 14d in the form of light having angular components indicating approximately the same direction, thereby forming illuminating light to be projected approximately in only one particular direction. During this time, since total reflection is used, light loss theoretically does not occur, so that efficient light-gathering control is enabled.

In the eighth embodiment, since the thickness of the light guide member 14 is gradually varied in YZ cross section within the exit area 14d, light may exit from the exit area 14d not only through the exit surface 14b but also through the opposite surface $14c_3$.

For this reason, the reflecting plate 15 having high reflectance is disposed in the vicinity of the surface $14c_3$ so that only light which is imperfectly totally reflected and exits from the surface $14c_3$ is reflected back to the light guide member 14. With this arrangement, all the light beams that can be controlled by total reflection can be completely controlled by using total reflection, so that the loss of the amount of light at the reflecting surface of the reflecting plate 15 is minimized and efficient illumination is achieved.

Although in the eighth embodiment the reflecting plate 15 of high reflectance is disposed on the surface $14c_1$ opposite to the exit surface 14b, the present invention is not necessarily limited to such an arrangement, and the surface $14c_3$ opposite to the exit surface 14b may be coated with an evaporated metal film of high reflectance. In this case, although light is slightly absorbed into the evaporated metal film on the surface $14c_3$, there are no components which leak through the gap between the light guide member 14 and the reflecting plate 15 as described previously, so that the loss of the amount of light is prevented and efficiency may be rather improved.

In the eighth embodiment, the exit area 14d of the light guide member 14 has a cross-sectional shape with a pointed end portion. The top and bottom surfaces $14c_3$ and $14c_4$ of the pointed end portion are formed of a plane or curved surface so that components having small incident angles can correctly exit from the exit area 14d. This construction prevents light beams from being reflected back toward the flash discharge tube 12 by the top and bottom surfaces $14c_3$ and $14c_4$ of the exit area 14d.

Figure 15:
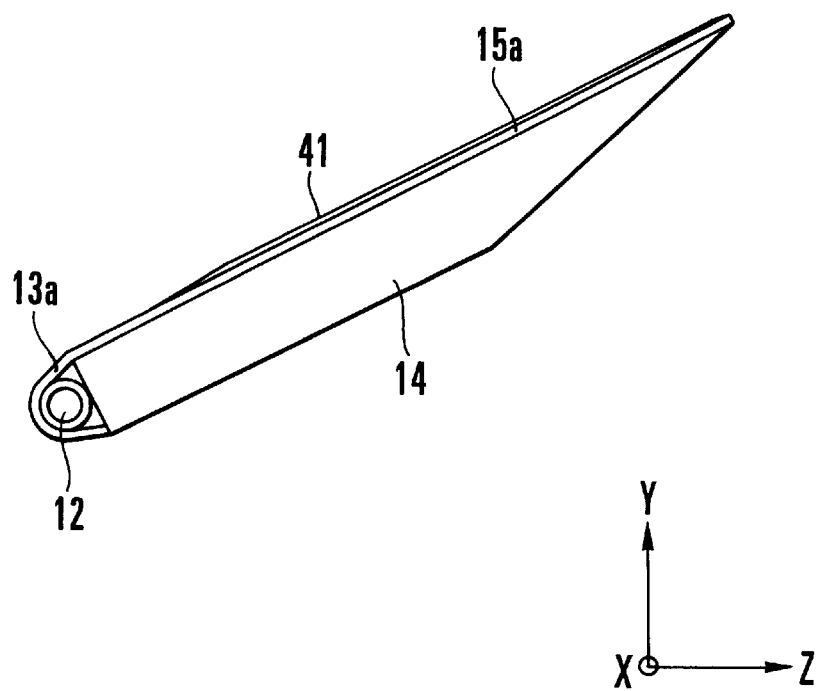
FIG. 15 is a diagrammatic view of the essential portion of an illuminating device according to a ninth embodiment of the present invention.

FIG. 15 is a diagrammatic cross-sectional view showing the essential portion of an optical member according to a ninth embodiment of the present invention. In the eighth embodiment shown in FIG. 14, the reflecting mirror 13 and the reflecting plate 15 are handled as two independent parts. In contrast, in the ninth embodiment, a reflector 13a and a reflecting plate 15a are partly connected to each other, and are formed as an integrated part from a material 41 having high reflectance. Thus, the entire device can be made far simpler.

Figure 16:
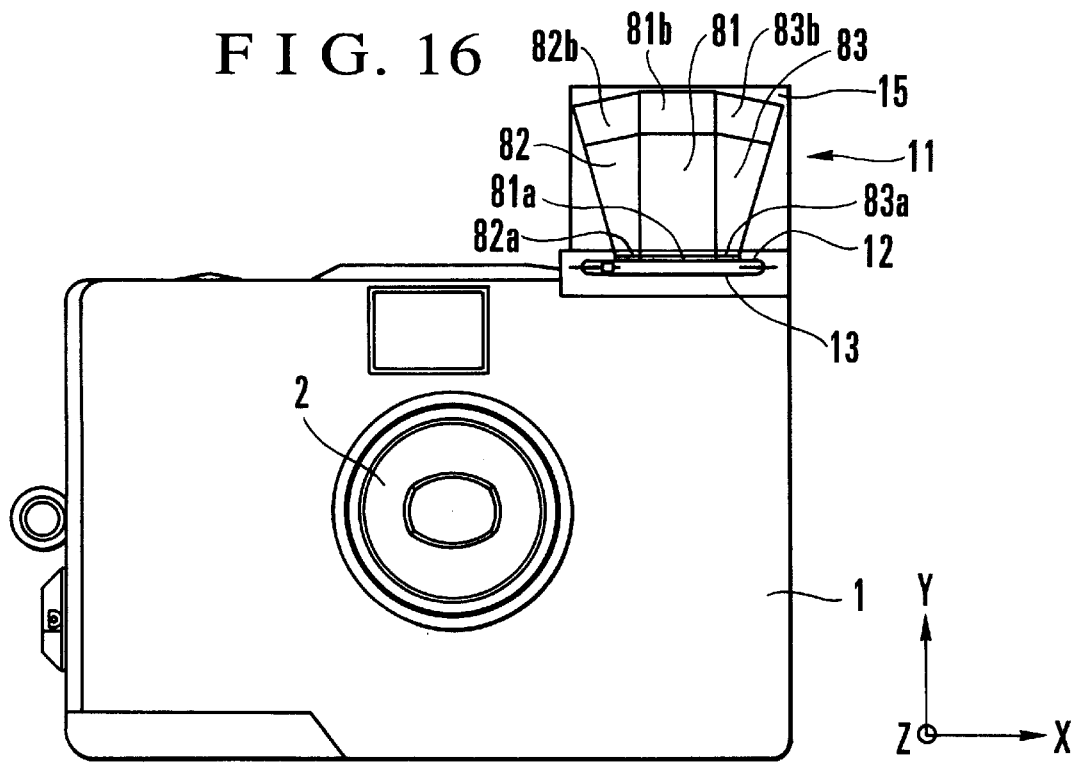
FIG. 16 is a diagrammatic front view of the essential portion of a construction in which an illuminating device according to a tenth embodiment of the present invention is applied to a camera.
Figure 17:
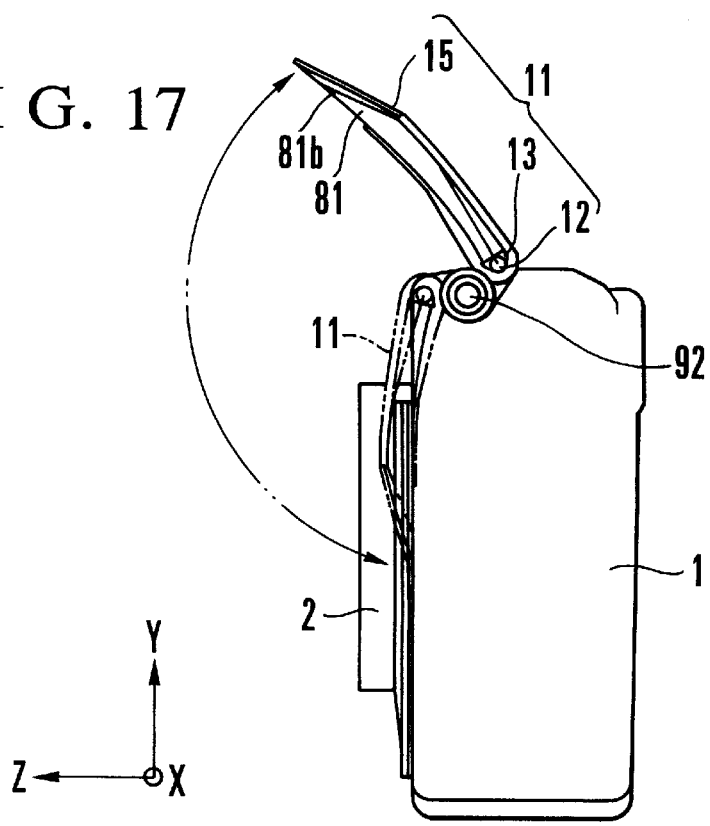
FIG. 17 is a diagrammatic side view of the essential portion of the construction in which the illuminating device according to the tenth embodiment of the present invention is applied to the camera.
Figure 18:
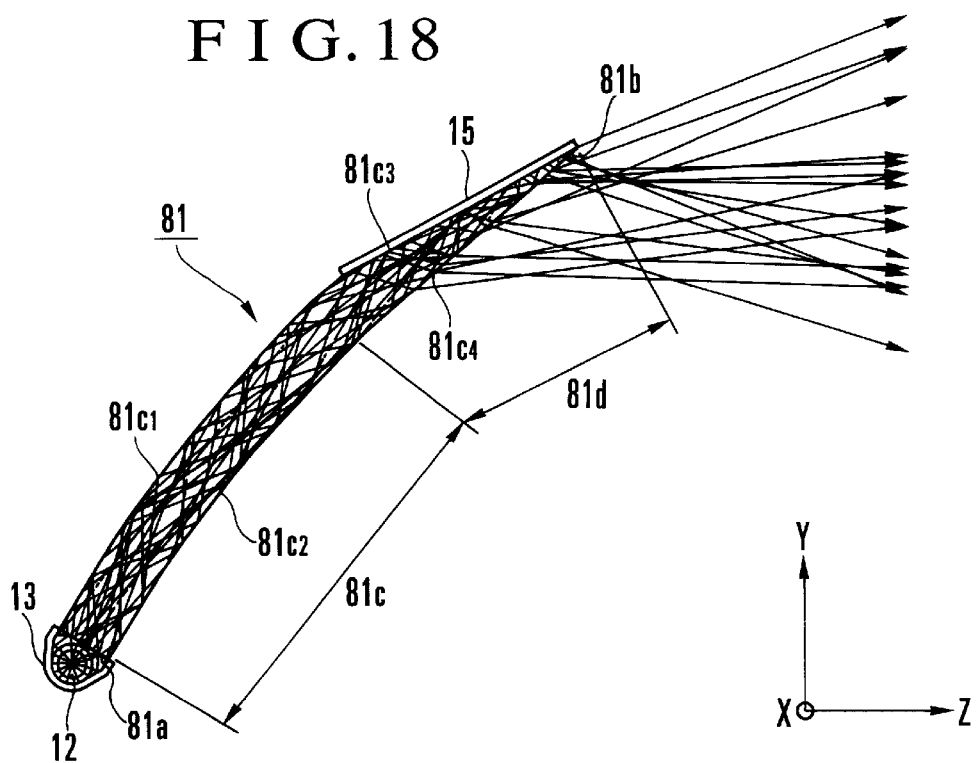
FIG. 18 is an explanatory view of the illuminating device shown in FIG. 16.
Figure 19:
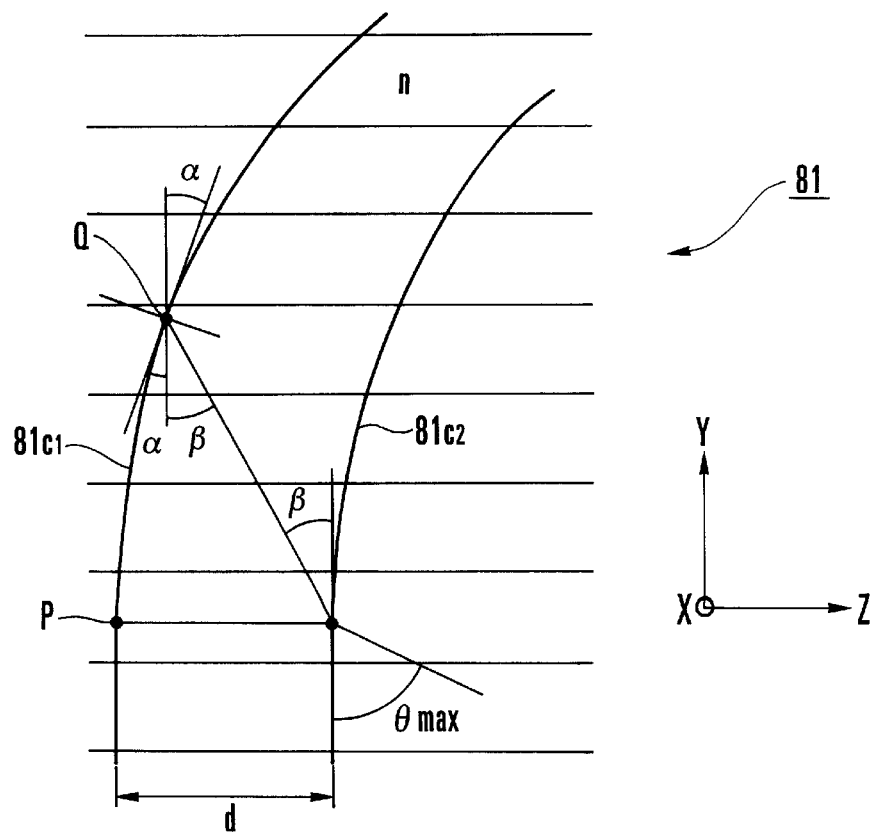
FIG. 19 is an enlarged explanatory view of a portion of an optical member shown in FIG. 18.

FIGS. 16 and 17 are a diagrammatic front view and a diagrammatic side view showing a tenth embodiment in which the illuminating device 11 according to the present invention is fitted to a portion of the camera body 1 for rotation about a rotational shaft 92. FIG. 18 is a diagrammatic cross-sectional view of the essential portion of an illuminating device according to the tenth embodiment, and FIG. 19 is an enlarged view of a portion of the optical member shown in FIG. 18.

The tenth embodiment is basically identical in construction to the eighth embodiment shown in FIG. 12 except for only the shape of an optical member (a light guide member) (81–83) which constitutes part of the illuminating device 11.

In FIGS. 16 to 18, identical reference numerals are used to denote constituent elements identical to those shown in FIG. 12. FIG. 17 shows the state in which the illuminating device 11 is in use and an exit surface (81b–83b) of the light guide member (81–83) is directly opposed to an object. When not in use, the illuminating device 11 is rotated counterclockwise about the rotational shaft 92 and retracted to a position where it covers part of the camera body 1. The emission surface of the flash discharge tube 12 and the rotational shaft 92 are parallel to the X axis.

In the tenth embodiment, a light guide area 81c of the light guide member 81 has a strip-like shape which is bent in its YZ cross section as shown in FIG. 18. Surfaces $81c_1$ and $81c_2$ of the light guide area 81c are respectively made from curved surfaces in YZ cross section.

In the tenth embodiment, the exit surface (81b–83b) is moved to a position greatly distant from the optical axis of a photographing lens so as to prevent a red-eye phenomenon from occurring during photography. An exit area 81d has a thickness which gradually decreases in YZ cross section. The thickness (in YZ cross section) of the light guide area 81c is constant, and the thickness of the exit area 81d becomes gradually smaller in a direction away from an entrance surface (81a–83a).

The exit surface 81b has a concave shape, and a surface $81c_3$ opposite to the exit surface 81b has a plane or convex shape (if the surface $81c_3$ has a convex shape, the reflecting surface of the reflecting plate 15 has a concave shape). The XY cross-sectional shape of the light guide member 81 is set so that the exit surface 81b is longer than the entrance surface 81a in the X direction as shown in FIG. 16.

In the tenth embodiment, the thickness of the light guide member 81 in the exit area 81d is made gradually smaller in YZ cross section (in the Y direction) in a direction away from the entrance surface 81a so that the exit surface 81b can serve as a surface light source to efficiently project light beams toward an object side.

In addition, the thickness of the light guide member 81 is made constant in YZ cross section within the light guide area 81c and the curvature in YZ cross section of each of the surfaces $81c_1$ and $81c_2$ is set in the following manner so that the light beams which have entered the light guide member 81 through the entrance surface 81a is efficiently guided to the exit surface 81b.

A method of setting the shape (curvature) in YZ cross section of the light guide member 81 according to the tenth embodiment will be described below with reference to FIG. 19. Letting $\theta_{max}$ be a maximum incident angle of light beams which enter the light guide member 81, letting $\alpha$ be an angle of a tangent to the curved surface $81c_1$ at a point Q, and letting "n" be the refractive index of the material of the light guide member 81, the following condition is obtained:

$$\sin \theta_{max} = n \sin \beta, \beta = \sin^{-1}((\sin \theta_{max})/n).$$

Further, the following condition for total reflection is obtained:

$$90°-\beta-\alpha \geq \sin^{-1}(1/n), \alpha \leq 90°-\beta-\sin^{-1}(1/n).$$

If the maximum incident angle of the light beams is 90° and the material of the light guide member 81 is an acrylic resin (n=1.49171), $\alpha$ is:

$$\alpha \leq 5.8084°.$$

In the tenth embodiment, a light guide member free of leakage of rays is formed by making a curvature R of the surface $81c_1$ larger than a curve which touches a point P and passes through the point Q.

As shown in FIG. 19, if "d" represents the width of the light guide member 81 and "n" represents the refractive index of the material of the light guide member 81, the curvature R depends on factors such as the maximum incident angle $\theta_{max}$ of light beams which enter the light guide member 81. This relation does not cope with a construction in which the thickness of the light guide member 81 gradually varies. If the relation is applied to a construction in which the thickness of the light guide member 81 becomes gradually larger, the leakage of rays does not easily occur, whereas if the relation is applied to a construction in which the thickness of the light guide member 81 becomes gradually smaller, the smaller the thickness, the leakage of rays occurs more easily.

As is apparent from the foregoing description, in accordance with the present invention, it is possible to achieve an illuminating device suitable for use in a still camera, a video camera and the like, which can project light beams (illuminating light) emitted from a light source toward an object side with high efficiency via a light guide member (optical member) which is appropriately constructed. Further, it is possible to achieve a photographing apparatus using such illuminating device.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

We claim:

1. An illuminating device comprising light source means and an optical member, said illuminating device being arranged to project a light beam emitted from said light source means, via said optical member as illuminating light, said optical member including a plurality of light guides each having an entrance surface opposed to said light source means, reflecting surfaces for reflecting the light beam which enters said optical member through the entrance surface, and an exit surface opposed to the entrance surface and having an area larger than the entrance surface, the plurality of light guides being adjacently disposed in such a manner that each of air layers is formed in at least part of each area at which the plurality of light guides are adjacent to each other, said light source means having a flash discharge tube, and the plurality of light guides being arrayed in a direction of an arc length of the flash discharge tube.

2. An illuminating device according to claim 1, wherein the air layers extend approximately radially from a center of an emission part of said light source means.

3. An illuminating device according to claim 1, wherein each of the air layers increases in width from the entrance surface toward the exit surface.

4. An illuminating device according to claim 1, wherein the air layers are respectively formed by V grooves each of which is provided between adjacent ones of the light guides.

5. An illuminating device according to claim 4, wherein the V grooves are provided in top surfaces or bottom surfaces of the respective light guides.

6. An illuminating device according to claim 4, wherein the V grooves are provided in the top surfaces and the bottom surfaces of the respective light guides in such a manner that the V grooves provided in the top surfaces and those provided in the bottom surfaces are opposed to each other or out of phase with each other in a direction in which the light guides are arrayed.

7. An illuminating device according to claim 1, wherein the reflecting surfaces are total reflection surfaces.

8. An illuminating device according to claim 1, wherein said light source means has a flash discharge tube, and the entrance surfaces of the plurality of light guides are unidimensionally arrayed in a direction of an arc length of the flash discharge tube, while the exit surfaces of the plurality of light guides are adjacently disposed in a vertically staggered manner with respect to the direction of the arc length.

9. An illuminating device according to claim 1, wherein the plurality of light guides are disposed to radially expand from an entrance-surface side toward an exit-surface side.

10. An illuminating device according to claim 1, wherein the reflecting surfaces are top and bottom surfaces and side surfaces, relative to a travelling direction of the light beam, of each of the light guides.

11. An illuminating device according to claim 1, wherein each of the light guides has a light guide portion whose cross-sectional area perpendicular to a travelling direction of the light beam increases at a constant rate from the entrance surface toward the exit surface.

12. An illuminating device according to claim 1, wherein each of the light guides has a light guide portion whose cross-sectional area perpendicular to a travelling direction of the light beam increases in the form of a higher-order function from the entrance surface toward the exit surface.

13. An illuminating device according to claim 1, wherein the entrance surface is formed by a plane surface.

14. An illuminating device according to claim 1, wherein each of the reflecting surfaces is formed by a plane surface.

15. An illuminating device according to claim 1, wherein the exit surface is formed by a plane surface.

16. An illuminating device according to claim 1, wherein each of top and bottom surfaces relative to a travelling direction of the light beam is formed by a free curved surface formed by continuously arranging envelopes which connect the entrance surface and the exit surface.

17. A photographing apparatus which uses light beams emitted from an illuminating device according to claim 1.

18. A photographing apparatus according to claim 17, wherein said illuminating device is slidably fitted to a portion of a body of said photographing apparatus.

19. An illuminating device according to claim 1, wherein the air layers are respectively formed by rectangular grooves each of which is provided between adjacent ones of the light guides.

20. An illuminating device according to claim 19, wherein the rectangular grooves are provided in top surfaces or bottom surfaces of the respective light guides.

21. An illuminating device according to claim 19, wherein the rectangular grooves are provided in the top surfaces and the bottom surfaces of the respective light guides in such a manner that the rectangular grooves provided in the top surfaces and those provided in the bottom surfaces are opposed to each other or out of phase with each other in a direction in which the light guides are arrayed.

22. An illuminating device according to claim 1, wherein the entrance surface is formed by a curved surface.

23. An illuminating device according to claim 1, wherein each of the reflecting surfaces is formed by a curved surface.

24. An illuminating device according to claim 1, wherein the exit surface is formed by a curved surface.

* * * * *

UNITED STATES PATENT AND TRADEMARK OFFICE
CERTIFICATE OF CORRECTION

PATENT NO. : 6,022,117

DATED : February 8, 2000

INVENTOR(S): YOSHIHARU TENMYO, ET AL.

It is certified that error appears in the above-identified patent and that said Letters Patent is hereby corrected as shown below:

COLUMN 2

Line 12, "air" should read --the air--.

COLUMN 5

Line 56, "5-1d" should read --5-$d_1$--.

COLUMN 9

Line 57, "three.) Although" should read --three.)
¶ Although-- (new paragraph).

Signed and Sealed this

Fifteenth Day of May, 2001

Attest:

NICHOLAS P. GODICI

Attesting Officer      Acting Director of the United States Patent and Trademark Office